May 30, 1967 R. W. PAULEY 3,322,212
OSCILLATORY DRIVEN IMPULSE TOOL
Filed April 13, 1965 5 Sheets-Sheet 1

INVENTOR.
REGINALD W. PAULEY
BY Charles J. Worth
AGENT

May 30, 1967 R. W. PAULEY 3,322,212
OSCILLATORY DRIVEN IMPULSE TOOL
Filed April 13, 1965 5 Sheets-Sheet 4

INVENTOR.
REGINALD W. PAULEY
BY Charles J. Worth
AGENT

U nited States Patent Office 3,322,212
Patented May 30, 1967

3,322,212
OSCILLATORY DRIVEN IMPULSE TOOL
Reginald W. Pauley, Somerville, N.J., assignor to Ingersoll-Rand Company, New York, N.Y., a corporation of New Jersey
Filed Apr. 13, 1965, Ser. No. 447,855
3 Claims. (Cl. 173—163)

ABSTRACT OF THE DISCLOSURE

A hydraulic impulse tool for applying plural rotary impulses to a fastener and driven by an oscillating motor. The tool includes a driven member and driving member, one member including a housing containing a hydraulic fluid and the other member including a spindle mounted in the housing and the fluid for relative oscillating movement. The spindle includes a spindle blade and the housing includes a housing blade. The two blades cooperate with sealing means in the housing to trap fluid between them partway through the forward oscillating stroke of the driven member to apply an impulse to the driving member.

---

This invention relates to impulse tools and more particularly to an improved impulse tool of the oscillating type.

Heretofore, impulse tools have been of the type disclosed in the following U.S. patent and U.S. patent applications:

| U.S. Patent No. | Issue Date | Inventor |
| --- | --- | --- |
| 3,116,617 | Jan. 7, 1964 | D. K. Skoog. |
| 3,263,426 | Aug. 2, 1966 | D. K. Skoog. |
| 3,203,203 | Aug. 31, 1965 | D. K. Skoog et al. |
| 3,221,515 | Dec. 7, 1965 | D. K. Skoog et al. |
| 3,203,204 | Aug. 31, 1965 | C. K. Brown. |
| 3,210,961 | Oct. 12, 1965 | D. K. Skoog et al. |
| 3,292,369 | Dec. 20, 1965 | D. K. Skoog et al. |
| 3,212,295 | Oct. 19, 1965 | D. K. Skoog et al. |
| 3,210,960 | Oct. 12, 1965 | D. K. Skoog et al. |
| 3,212,294 | Oct. 19, 1965 | D. K. Skoog et al. |
| 3,210,963 | Oct. 12, 1965 | D. K. Skoog et al. |
| 3,212,292 | Oct. 19, 1965 | D. K. Skoog et al. |
| 3,212,293 | -----do------- | D. K. Skoog et al. |
| 3,192,739 | July 6, 1965 | C. K. Brown. |
| 3,210,959 | Oct. 12, 1965 | C. K. Brown. |
| 3,289,407 | Dec. 6, 1966 | C. K. Brown. |
| 3,191,404 | June 29, 1965 | G. P. Schivley, Jr. |
| 3,222,886 | Dec. 14, 1965 | G. P. Schivley, Jr. |
| 3,199,314 | Aug. 10, 1965 | C. L. Schrader. |
| 3,196,636 | July 27, 1965 | D. R. Piatt et al. |
| 3,237,347 | Mar. 1, 1966 | C. K. Brown. |
| 3,182,470 | May 11, 1965 | G. N. Smith. |
| 3,214,940 | Nov. 2, 1965 | Leo Kramer. |
| 3,214,941 | -----do------- | R. B. Shulters. |
| 3,263,449 | Aug. 2, 1966 | Leo Kramer. |

While such conventional impulse tools operate satisfactorily such conventional impulse tools have the following limitations:

(1) a large volume of fluid is compressed under high pressure, giving a relatively low torsional stiffness;
(2) the leakage of fluid from the high pressure side through the sliding blade joints, reduces the torque output;
(3) the low stiffness of the spindle blade and spindle shaft limits maximum torque output;
(4) the sealing effectiveness is limited by the relatively small portion of each revolution of the relative rotary movement when a seal can be formed between the housing means and the spindle means.

It is the general object of the present invention to avoid and overcome the foregoing and other difficulties of and objection to prior art practices by the provision of an improved impulse tool which:

(1) substantially reduces the volume of fluid under high pressure thereby providing a relatively high torsional stiffness;
(2) substantially reduces the leakage of fluid from the high pressure side to the low pressure side of the cavity in the housing means;
(3) provides a relatively stiffer spindle blade thereby increasing maximum torque output;
(4) and increases the degree of sealing during the relative rotary movement between the housing means and the spindle means by increasing the land length.

The aforesaid objects of the present invention, and other objects which will become apparent as the description proceeds, are achieved by providing an impulse tool for applying a torque to an object. The impulse tool has housing means provided with a cavity for sealingly containing a fluid. Spindle means are in the cavity and in the fluid. Drive means are operatively associated with one of the housing means and the spindle means for causing relative oscillatory movement between the housing means and the spindle means, the other of housing means and spindle means being adapted to engage the object. Sealing means or spindle blade means are on the spindle means, a first sealing portion is on the housing means, and housing blade means are on the housing means and in the cavity and in the fluid. The first sealing portion and the sealing means are disposed in sealing relation during a relatively small portion of each partial revolution of the relative oscillating movement. The first sealing portion, the sealing means and the housing blade means are operable during the relatively small portion of each partial revolution of the relative oscillatory movement to dynamically seal off the fluid into a high pressure portion and a low pressure portion so that the pressure in the high pressure portion of the fluid and on the other of the housing means and the spindle means increases thereby causing the other to rotate with respect to the one of the housing means and the spindle means and to apply a torque to the object.

Alternatively the impulse tool of the present invention is employed as a source of fluid impulses for a tool by connecting one of the housing means and the spindle means to the casing means and providing passage means in the connected one in communication with the high pressure portion and extending through the connected one to a tool. The tool is operable to cause a pulse of fluid to flow through the passage means to the tool.

Although the principles of the present invention are broadly applicable to impulse tools in general the present invention is particularly adapted for use as an impulse tool of the oscillating type and hence it has been so illustrated and will be so described.

For a better understanding of the present invention, reference should be had to the accompanying drawings, wherein like numerals of reference indicate similar parts throughout the several views and wherein.

Figure 1:
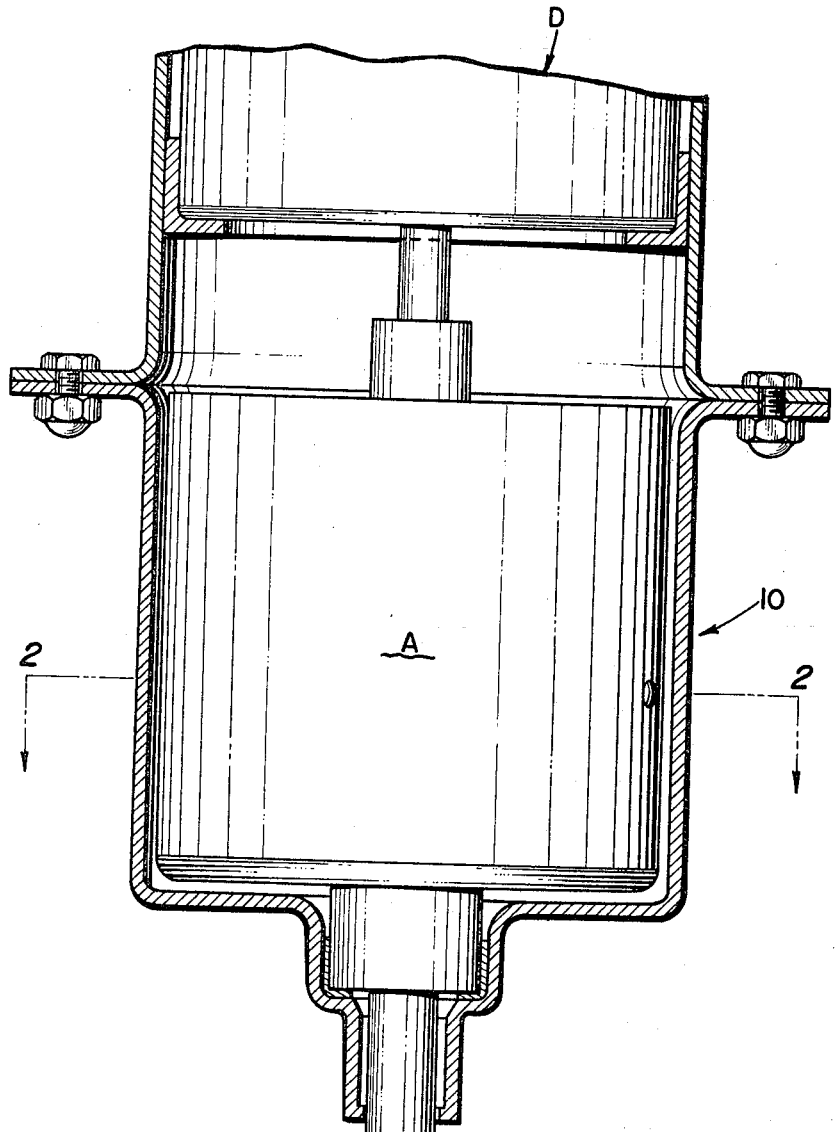
FIG. 1 is a fragmentary side elevation view of the improved tool of the present invention wherein the drive means is connected to the housing means and the spindle means is connected to the object.
Figure 2:
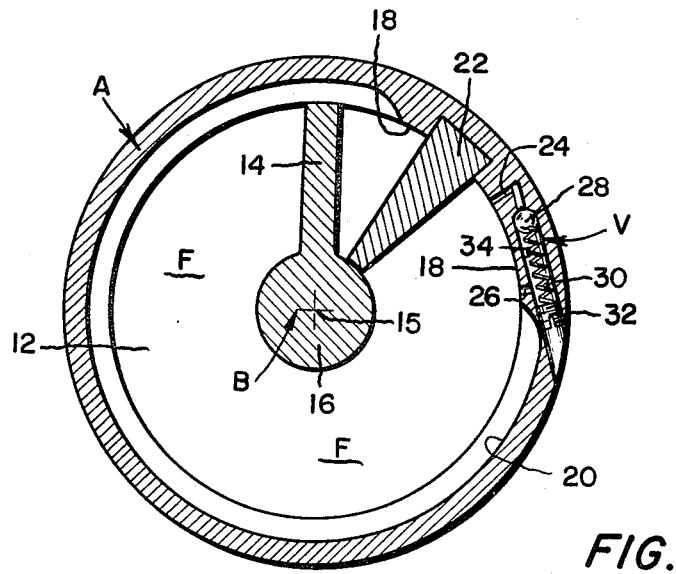
FIG. 2 is a horizontal sectional view taken along the line 2—2 of FIG. 1 in the direction of the arrows and showing the housing blade means in the starting position.
Figure 3:
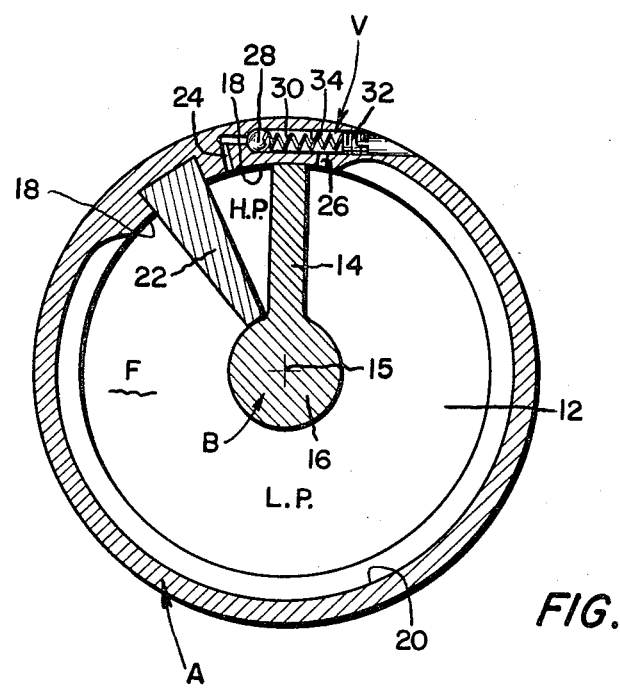
FIG. 3 is a view similar to FIG. 2 showing the housing blade means in the impulsing position after a clockwise driving stroke.

With specific references to the form of the present invention illustrated in the drawings, and referring particularly to FIGS. 1–3, an impulse tool for applying a torque to an object, such as the nut N, is indicated generally by the reference numeral 10.

This impulse tool 10 has a housing means, such as the housing A, provided with a cavity 12 for sealingly containing a fluid, such as oil F. Spindle means B are disposed in the cavity 12 and in the oil F. Drives means (such as an oscillating motor D of the type shown in the U.S. Patent No. 2,987,747, issued June 13, 1961 to J. R. Orshei et al, U.S. Patent No. 2,354,189 issued July 25, 1944 to R. B. Bell and U.S. Patent No. 2,297,900 issued October 6, 1942 to R. K. Lee) are connected with one of the housing means A and spindle means B for causing relative oscillatory movement between the housing means A and the spindle means B. In this case the motor D is connected to the housing means A. The other of the housing means A and the spindle means B (i.e. spindle means B) engages the nut N by means of socket 13. Center 15 is the center of the housing means A, spindle means B and cavity 12.

Sealing means, such as the spindle blade 14 FIGS. 2, 3, (mounted on the spindle shaft 16) are on the spindle means B. A first sealing portion, such as the land 18 FIGS. 2, 3, (between undercut 20 in the housing means A), is provided on the housing means A. Housing blade means, such as the housing blade 22, is provided on the housing means A and projects into the cavity 12 and into the oil F.

Operation

When the housing means A is moved (clockwise FIGS. 2, 3) by the motor D on its driving stroke from the position shown in FIG. 2 to the position shown in FIG. 3, the land 18 and the spindle blade 16 are disposed in sealing relation during a relatively small portion of the partial clockwise revolution of the oscillating movement of the housing means A (FIGS. 2, 3). The land 18, the spindle blade 14 and the housing blade 22 (FIG. 3) are operable during this small portion of the oscillating movement to dynamically seal off the oil F into a high pressure portion HP (FIG. 3) and a low pressure portion LP, so that the pressure in the high pressure portion HP of the oil F and on the spindle means B increases thereby causing the spindle means B to rotate with the housing means A and to apply a torque to the nut N.

Thereafter the motor D on its return stroke, reverses to counterclockwise direction and returns the housing means A and housing blade 22 to the starting position shown in FIG. 2.

Relief valve means

When the pressure in high pressure portion HP reaches a predetermined value which corresponds to maximum torque on the nut N, a pressure relief valve V in one of the housing means A and spindle means B (in this case the housing means A (FIGS. 2, 3)) is operable to relieve the pressure in the high pressure portion HP. The valve V communicates by ports 24, 26 with the high pressure portion HP and low pressure portion LP and has a ball 28, spring 30 and body 32 in bore 34 in the housing means A.

Alternative embodiments

Figure 4:
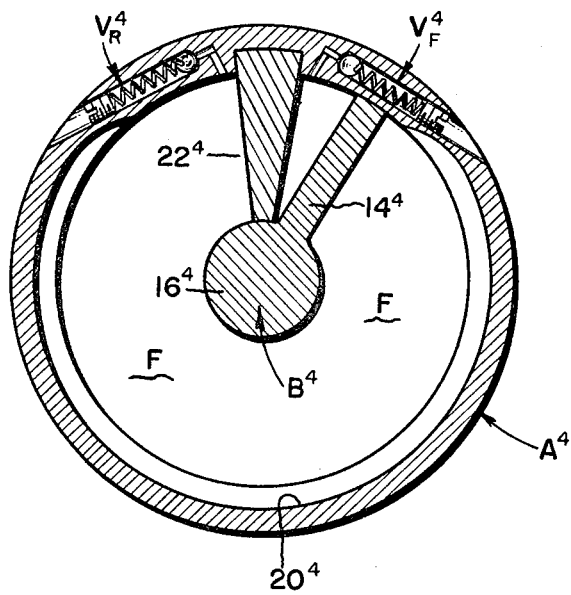
FIGS. 4, 5 are views similar to FIGS. 2, 3 of an alternative embodiment utilizing a counter clockwise driving stroke of the drive means.
Figure 5:
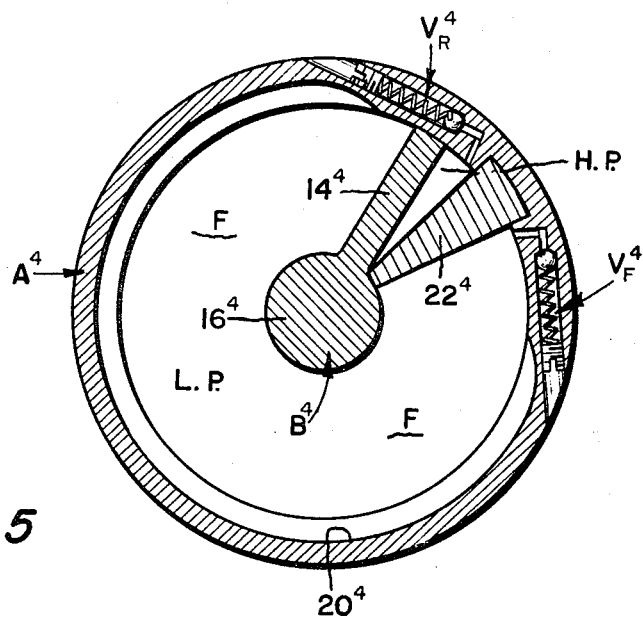

It will be understood by those skilled in the art that alternatively if the impulse tool of the present invention is provided with reverse operation, the embodiment of FIGS. 4, 5 is utilized. As the housing means $A^4$ moves in its driving stroke counterclockwise (FIGS. 4, 5) from the starting position shown in FIG. 4 to the impulsing position (FIG. 5), the reverse direction relief valve $V_R^4$ is utilized to relieve the pressure in the high pressure portion HP.

Figure 6:
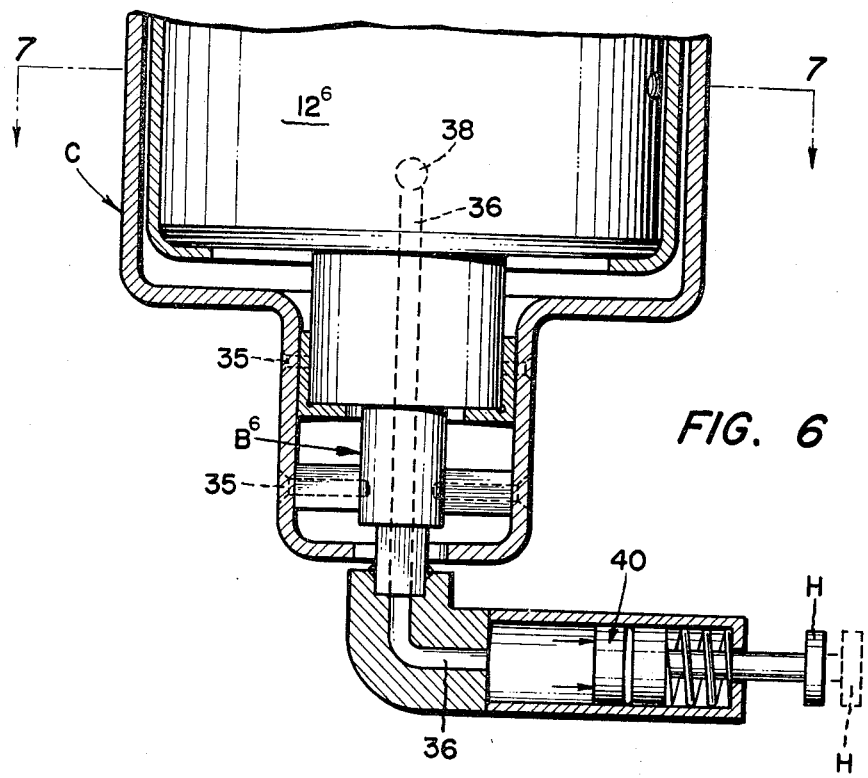
FIG. 6 is a fragmentary vertical sectional view of the impulse tool used as a source of fluid impulses wherein the spindle means is tied to the casing means.
Figure 7:
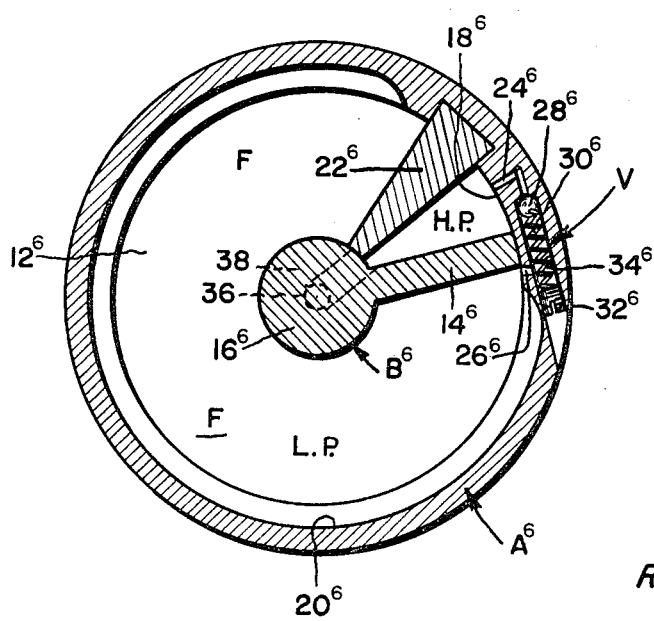
FIG. 7 is a horizontal sectional view taken along the line 7—7 of FIG. 6.

In FIGS. 6, 7 the spindle means $B^6$ is secured to a casing means C at 35 and passage means, such as the bores 36, 38 in the spindle means $B^6$ are in communication across valve means (not shown) with the high pressure portion HP (FIG. 7), extend through the spindle means $B^6$ and are connected to the tool, such as a hammer, by means of a hydraulic cylinder 40. The valve means (not shown) is the type which prevents flow to cylinder 40 until the pressure in the high pressure portion HP reaches a predetermined level while only a minimal pressure differential is required for return flow.

An arrangement (not shown) similar to that of FIGS. 6 and 7 for providing a pressure pulse in the clockwise direction and in the counterclockwise direction would comprise the housing means $A^4$ of FIGS. 4 and 5 and the spindle means $B^6$ of FIGS. 6 and 7. Spindle means $B^6$, in this instance, would have to be modified to provide two bores 38, each open on the opposite side of the vane $14^6$ from the other with a high pressure operated shuttle valve closing the bore 38 open to low pressure.

Figure 8:
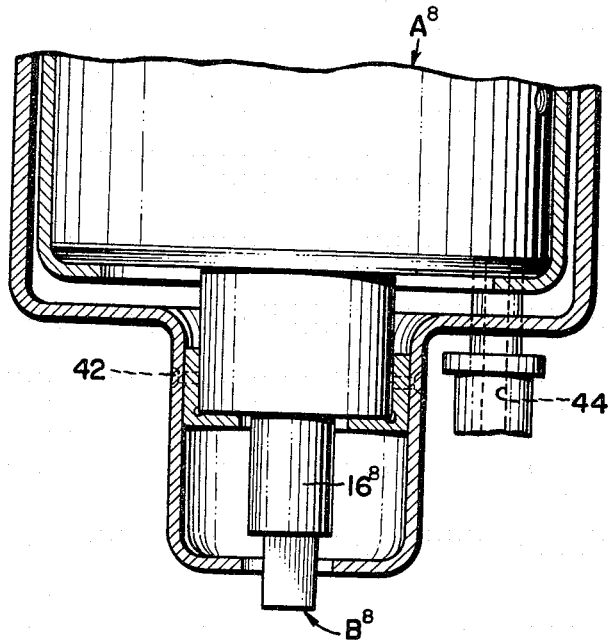
FIG. 8 is a view similar to FIG. 6 wherein the housing means is tied to the casing means.

Referring to FIG. 8, the housing means $A^8$ is secured at 42 and has passage means 44 from the high pressure portion HP (not shown in FIG. 8) to a hydraulic cylinder (not shown) such as cylinder 40 of FIG. 6.

It will be recognized by those skilled in the art that the objects of the present invention have been achieved by providing an imposed impulse tool which:

(1) substantially reduces the volume of fluid under high pressure thereby providing a relatively high torsional stiffness;
(2) substantially reduces the leakage of fluid from the high pressure side to the low pressure side of the cavity in the housing means;
(3) provides a relatively stiffer spindle blade thereby increasing maximum torque output;
(4) and increases the degree of sealing during the relative rotary movement between the housing means and the spindle means by increasing the land length.

While in accordance with the patent statutes preferred and alternative embodiments of the present invention have been illustrated and described in detail, it is to be particularly understood that the invention is not limited thereto or thereby.

I claim:
1. An impulse tool for applying a torque to an object, said imulse tool comprising:
   a driven member;
   a driving member;
   one of said members including housing means provided with a cavity for sealingly containing a fluid;
   the other of said members including spindle means mounted in said cavity and in said fluid for relative oscillation therebetween;
   drive means operatively connected to said driven member to oscillate it in the forward and backward directions and, thus, cause relative oscillatory movement between said housing means and said spindle means;
   said driving member being adapted to engage said object;
   spindle blade means on said spindle means and mounted in said housing means in a manner restricing it from moving axially relative to the housing means;
   a first sealing portion on said housing means;
   housing blade means on said housing means and in said cavity and in said fluid;
   said first sealing portion and said spindle blade means being disposed in sealing relation during a relatively small portion of each partial revolution of said relative oscillating movement in the forward direction;
   said first sealing portion, said spindle blade means and said housing blade means being operable during said relatively small portion of each partial revolution of said relative oscillatory movement to dynamically seal off said fluid into a high pressure portion and a low pressure portion so that the pressure in said high pressure portion of the fluid and on said housing means and said spindle means increases thereby causing said driving member to rotate with said driven member and to apply a torque to said object acting in the forward direction.

2. The impulse tool recited in claim 1 and having relief valve means in one of said housing means and said spindle means in communication with said fluid on said high pressure portion and said low pressure portion and operable when said pressure reaches a predetermined value which corresponds to maximum torque on said object to relieve the pressure in said high pressure portion of said fluid.

3. The impulse tool recited in claim 1 wherein said driven member includes said housing means and said driving member includes said spindle means.

References Cited

UNITED STATES PATENTS

| | | | |
|---|---|---|---|
| 1,422,929 | 7/1922 | Cooke | 64—26 |
| 2,307,187 | 1/1943 | Anderson | 64—26 |
| 2,565,289 | 8/1951 | Zak | 64—26 |
| 3,210,960 | 10/1965 | Vaughn | 173—93 |
| 3,212,294 | 10/1965 | Burnett et al. | 173—93 |

FRED C. MATTERN, Jr., *Primary Examiner.*

L. P. KESSLER, *Assistant Examiner.*